United States Patent
Watanabe

[11] Patent Number: 6,000,458
[45] Date of Patent: Dec. 14, 1999

[54] ISOTHERMAL-LIQUID CIRCULATING APPARATUS WITH MODULAR UNITS

[75] Inventor: Mitsuhiro Watanabe, Tsukuba-gun, Japan

[73] Assignee: SMC Corporation, Tokyo, Japan

[21] Appl. No.: 09/094,471

[22] Filed: Jun. 10, 1998

[30] Foreign Application Priority Data

Jul. 14, 1997 [JP] Japan .................................. 9-203841

[51] Int. Cl.⁶ ............................................. F25B 29/00
[52] U.S. Cl. ............................ 165/11.1; 165/263; 62/298
[58] Field of Search .................... 62/298; 165/11.1, 165/263

[56] References Cited

U.S. PATENT DOCUMENTS

| | | | |
|---|---|---|---|
| 3,360,032 | 12/1967 | Sherwood . | |
| 3,370,454 | 2/1968 | Flores | 165/108 |
| 3,771,321 | 11/1973 | Maksy | 165/11.1 |
| 4,729,424 | 3/1988 | Mizuno et al. | 165/80.4 |
| 5,706,890 | 1/1998 | Sloan et al. | 165/64 |

FOREIGN PATENT DOCUMENTS 0161528   7/1986   Japan ........................................ 165/61

*Primary Examiner*—John K. Ford
*Attorney, Agent, or Firm*—Oblon, Spivak, McClelland, Maier & Neustadt, P.C.

[57] ABSTRACT

A cooling and circulating unit 2 comprising a cooling circuit section including a heat exchanger 21 that cools a refrigerant liquid and a circulating circuit section for heating the cooled refrigerant liquid and then delivering it; an input/display unit 3 including a temperature setting device 32 for setting the temperature of the refrigerant liquid, and an operation display device 33; a control section unit 4 comprising a sequencer 41; and an electrical section unit 5 including various electrical parts that are integrated into units and the units 2 to 5 are independently and detachably mounted on a frame 1. All units are electrically connected together via a relay substrate 6 mounted on a frame 1.

1 Claim, 2 Drawing Sheets

ISOTHERMAL-LIQUID CIRCULATING APPARATUS WITH MODULAR UNITS

FIELD OF THE INVENTION

The present invention relates to an isothermal-liquid circulating apparatus for supplying an isothermal refrigerant liquid to mechanical apparatuses having an isothermal section and used in various industrial fields, and in particular, to an isothermal-liquid circulating apparatus all components of which are integrated into units.

PRIOR ART

Various mechanical apparatuses having an isothermal portion, e.g., semiconductor fabrication apparatuses, require an isothermal refrigerant liquid to be continuously supplied to the isothermal portion (a load) in order to maintain the load at a predetermined temperature. Thus, such apparatuses include an isothermal-liquid circulating apparatus that supplies an isothermal refrigerant liquid. The refrigerant liquid, the temperature of which has been increased by the load, is returned to the isothermal-liquid circulating apparatus, where the liquid is cooled by a heat exchanger, then heated by a heater to a predetermined temperature, and then circularly supplied to the load.

As described above, such an isothermal-liquid circulating apparatus is installed in not only the semiconductor fabrication apparatuses but also in mechanical apparatuses used in various industrial fields that require the temperature to be controlled, in order to support the operations of these apparatuses. Consequently, a defect in the isothermal-liquid circulating apparatus or its malfunction may cause its mechanical apparatus to be stopped, resulting in large losses. Thus, considerations are required so as to prevent defects and malfunctions. If any defect or malfunction occurs, the apparatus must be recovered to its normal operational conditions as promptly as possible.

DISCLOSURE OF THE INVENTION

It is a technical object of this invention to significantly improve the maintainability of the isothermal-liquid circulating apparatus while substantially reducing the number of assembly steps required during manufacturing.

To achieve this object, this invention provides an isothermal-liquid circulating apparatus for circulating and supplying an isothermal refrigerant liquid to a load, comprising a cooling circuit section for cooling in a heat exchanger the refrigerant liquid returned from the load; a circulating circuit section for heating to a predetermined temperature the refrigerant liquid cooled by the heat exchanger and then delivering it; and equipment for operating these sections, characterized in that all main components of the apparatus that function independently are integrated into units that are independently and detachably mounted on a frame and in that connectors provided on the respective units for electric wiring connections are detachably connected to a relay substrate mounted on the frame, the units being electrically connected together via the relay substrate.

In the isothermal-liquid circulating apparatus, the units of the main components are appropriately composed of a cooling and circulating unit comprising the cooling circuit section for cooling in a heat exchanger the refrigerant liquid returned from the load and the circulating circuit section for heating to a predetermined temperature the refrigerant liquid cooled by the heat exchanger and then delivering it; an input/display unit including an activation switch, a temperature setting device for setting the temperature of the refrigerant liquid, and an operation display device; a control section unit comprising a sequencer; and an electrical section unit including various electrical parts.

According to the isothermal-liquid having such a configuration, the main component units that function independently, i.e., the cooling and circulating unit, input/display unit, control section unit, and electrical section unit are independently and detachably mounted on the frame. Thus, if any unit becomes defective or malfunctions, that unit can be removed and temporarily replaced with a normal one to immediately restore the apparatus to its normal conditions, while the defective or malfunctioning unit can be brought to the factory for careful repairs. In addition, in replacing the unit, all electric wiring in the unit can be removed simply by disconnecting the connector connected to the relay substrate, and the electric wiring in the new unit can be established simply by connecting its connector to the relay substrate on a frame, thereby facilitating wiring.

As a result, this invention significantly improves the maintainability of the isothermal-liquid circulating apparatus while substantially reducing the number of assembly steps required during manufacturing.

DETAILED DESCRIPTION

Figure 1:
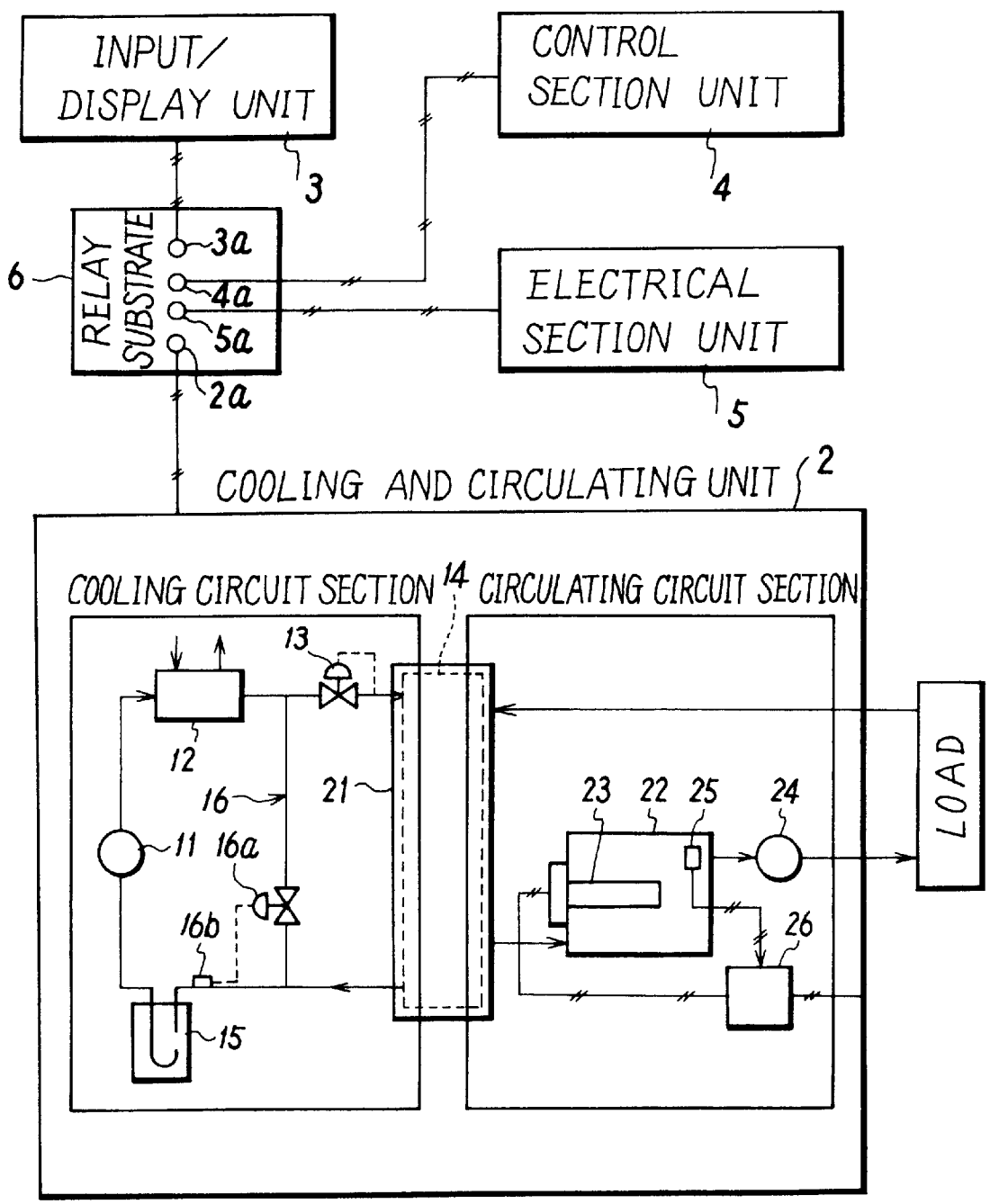
FIG. 1 is an explanatory drawing showing a configuration of an isothermal-liquid circulating apparatus according to this invention.
Figure 2:
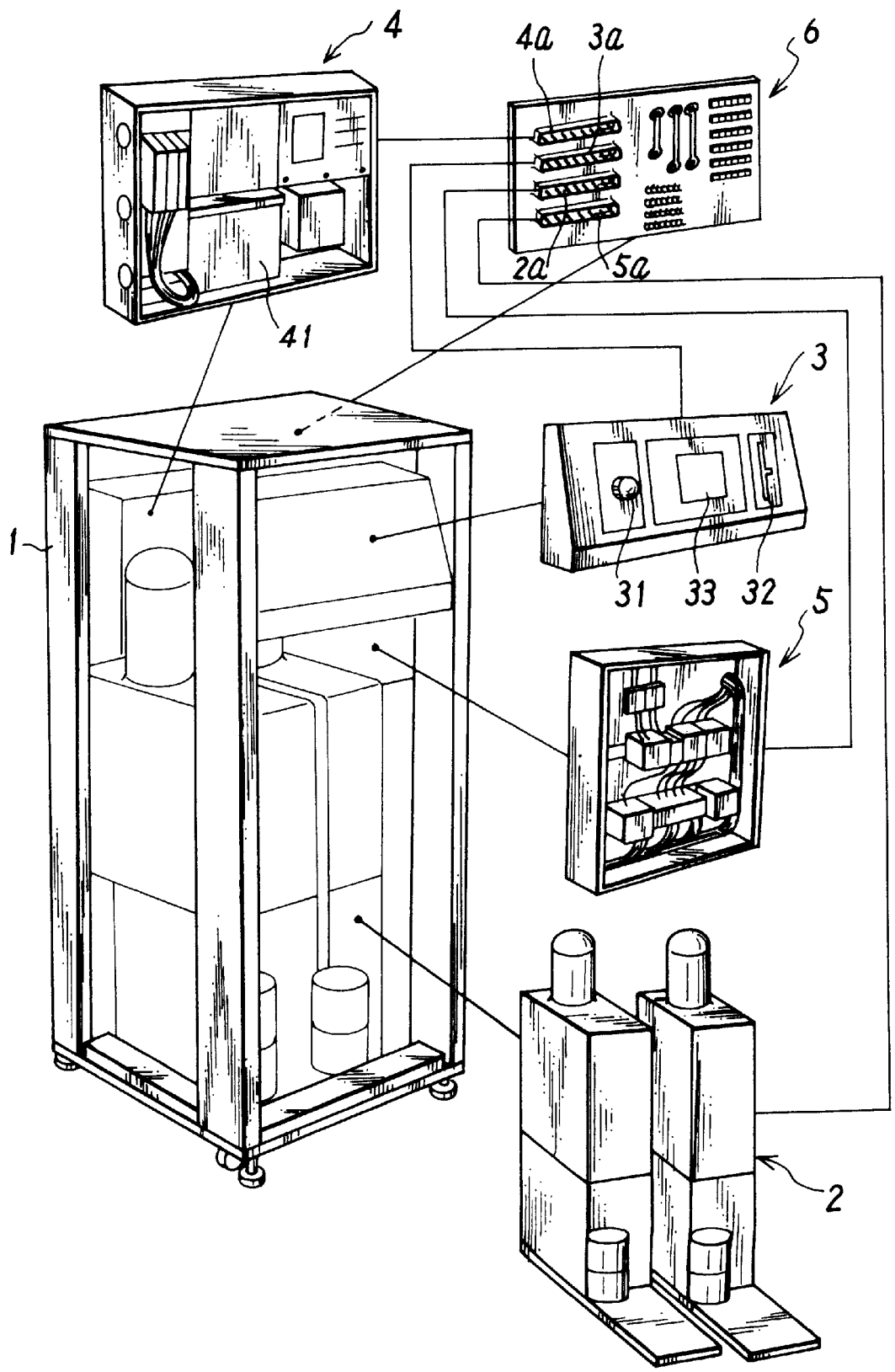
FIG. 2 is a block diagram.

FIGS. 1 and 2 show an embodiment of an isothermal-liquid circulating apparatus according to this invention.

This isothermal-liquid circulating apparatus essentially circulates and continuously supplies an isothermal refrigerant liquid to an isothermal section (a load) in various mechanical apparatuses, and mainly comprises a cooling circuit section for cooling in a heat exchanger the refrigerant liquid returned from the load; a circulating circuit section for heating to a predetermined temperature the refrigerant liquid cooled by the heat exchanger and then delivering it; and various equipment for operating these sections.

The isothermal-liquid circulating apparatus is configured so that the main components, which function independently, are integrated into units and so that the apparatus includes a frame 1 on which the units are independently and detachably mounted as shown in FIG. 1. The units of the main components function independently as described above and are integrated into units in such a way that the units can be mutually connected to other units using only electric wiring. Specifically, as illustrated in FIGS. 1 and 2, the units of the main components are appropriately composed of a cooling and circulating unit 2 comprising the cooling circuit section for cooling in a heat exchanger the refrigerant liquid returned from the load and the circulating circuit section for heating to a predetermined temperature the refrigerant liquid cooled by the heat exchanger and then delivering it; an input/display unit 3 in cluding an activation switch, a temperature setting device for setting the temperature of the refrigerant liquid, and an operation display device for displaying the current operational conditions; a control section unit 4 comprising a sequencer that provides a series of operations and controls; and an electrical section unit 5 including various electrical parts.

The units 2 to 5 of the components that are integrated into units are configured so as to be independently and detachably mounted on the frame 1. The "independent and detachable mounting" means that any unit can be independently installed on and removed from any part of the frame 1 using mounting means such as bolts (not shown) and without the need to remove other units.

If the units are mounted on the frame 1, covers can be installed as required on those parts of the frame 1 on which the units are mounted. The covers constitute part of the frame 1, so smaller units can be attached to these covers.

In addition, in installing or removing one of the units 2 to 5, that unit must be electrically connected to the required portions of the other units or be disconnected from them. If such operations are individually performed, the assembly or maintenance of the apparatus will be made significantly more complicated. Thus, connectors are provided on the respective units 2 to 5 for electric wiring connection so as to be detachably connected to connectors 2a to 5a on the relay substrate 6 independently mounted on the frame 1. Accordingly, the connection of the units 2 to 5 to a power supply and the connection of electric signal lines among the units can be established via the relay substrate 6.

The configuration of the units 2 to 5 is specifically described below.

First, the cooling and circulating unit 2 comprises the cooling circuit section for cooling in the heat exchanger the refrigerant liquid the temperature of which has been increased by the load; and the circulating circuit section for heating to a predetermined temperature the refrigerant liquid cooled by the heat exchanger and then delivering it, as shown in FIG. 2.

The cooling circuit section generally comprises a compressor 11 that compresses the refrigerant into a hot and highly pressurized gas; a condenser 12 that cools and condenses the gas into a highly pressurized refrigerant (liquid); a pressure-reducing device (a pressure-reducing valve) 13 that reduces the pressure of the refrigerant; an evaporator 14 that evaporates the refrigerant with its pressure reduced in order to reduce the temperature; and an accumulator 15, all of which are connected in series. Furthermore, the cooling circuit section includes an overheat prevention circuit 16 that directly returns the refrigerant compressed by the compressor 11 to the accumulator 15 when the evaporator 14 is subjected to a large load; and an overheat prevention valve 16a in the circuit 16 that opens and closes the overheat prevention circuit 16 based on readings from a temperature sensor 16b located on the upstream side of the accumulator 15 for detecting the temperature of the refrigerant. On the other hand, the circulating circuit section comprises a heat exchanger 21 that cools the returned refrigerant liquid with its temperature increased by the load by exchanging the heat between the refrigerant and the evaporator 14; a tank 22 for the refrigerant liquid having a heater 23 built into itself; and a pump 24 that supplies and circulates to the load the refrigerant liquid heated to a predetermined temperature by the heater 23, all of which are connected in series.

Thus, the refrigerant liquid with its temperature increased by the load is cooled by the refrigerant in the cooling circuit section that flows through the evaporator 14 provided in the heat exchanger 21.

In addition, a temperature sensor 25 that detects the temperature of the refrigerant liquid to output it as a signal is provided near an outlet of the tank 22, and a temperature controller 26 is installed in the circulating circuit section to control the amount of power supplied to the heater 23 based on the output signal from the temperature sensor 25. The temperature controller 26 compares the temperature detected by the temperature sensor 25 with a set temperature set in the input/display unit 3 beforehand in order to control the amount of power supplied to the heater 23, that is, the amount of heat provided in the tank 22. Without the temperature controller 26, the output signal from the temperature sensor 25 may be transmitted to the control section unit 4 via the relay substrate 6 so that the control section unit 4 takes over the functions of the temperature controller 26.

On the other hand, the input/display unit 3 constitutes an input and display panel in the isothermal-liquid circulating apparatus, and generally includes an activation switch 31; a temperature setting device 32 for setting the temperature of the refrigerant liquid; an operation display device 33 for displaying the current operational conditions; and an alarm device informing an operator of an inappropriate input or operation. Each of the components of the input/display unit 3 can have an arbitrary structure but may be configured to allow touch inputs according to instructions displayed on a touch panel.

In addition, the control section unit 4 includes a sequencer-programmable logic controller 41 that controls a series of operations and that are provided with various control functions as required.

Although sensors provided in the respective portions of the cooling and circulating unit 2 for checking operations or various controls provided for the isothermal-liquid circulating apparatus based on the output from the sensors have not been specifically described, various common sensors may be mounted to provide various common controls based on these sensors.

Furthermore, the electrical section unit 5 includes, for example, a breaker, a timer, and other various electrical devices that can be collectively mounted on the frame 1.

According to the isothermal-liquid circulating apparatus of this configuration, the cooling and circulating unit 2, input/display unit 3, control section unit 4, and electrical section unit 5 are independently and detachably mounted on the frame 1 using bolts. Thus, if any unit becomes defective or malfunctions, that unit can be removed and temporarily replaced with a normal one to immediately restore the apparatus to its normal conditions, while the defective or malfunctioning unit can be brought to the factory for careful repairs.

In addition, in replacing the unit 2 to 5, all electric wiring in the unit can be removed simply by disconnecting the connector connected to the relay substrate 6, and the electric wiring in the new unit can be established simply by connecting its connector to the relay substrate 6 on the frame 1, thereby enabling easy wiring.

As a result, the maintainability of the isothermal-liquid circulating apparatus can be significantly improved while the number of assembly steps required during manufacturing can be substantially reduced to improve the assembly capability.

The isothermal-liquid circulating apparatus according to this invention described above can significantly improve the maintainability of the isothermal-liquid circulating apparatus while substantially reducing the number of assembly steps required during manufacturing.

What is claimed is:

1. An isothermal-liquid circulating apparatus which circulates and supplies an isothermal refrigerant liquid to a load, comprising:

a cooling and circulating unit comprising a cooling circuit section which cools the refrigerant liquid returned from the load in a heat exchanger, and a circulating circuit section which heats to a predetermined temperature the refrigerant liquid cooled by said heat exchanger and delivers said refrigerant to said load;

an input/display unit including an activation switch;

a temperature setting device which sets the temperature of the refrigerant liquid;

an operation display device;

a control section unit comprising a sequencer;

an electrical section unit comprising various electrical parts; and a relay substrate;

wherein said cooling and circulating unit, said input/display unit, said electrical section unit, and said control section unit are integrated into units that are independently and detachably mounted on a frame, and further wherein connectors are provided on said cooling and circulating unit, said input/display unit, said electrical section unit and said control section unit for detachably electrically connecting said units to the relay substrate.

* * * * *